(12) United States Patent
Pierce

(10) Patent No.: US 8,579,553 B2
(45) Date of Patent: Nov. 12, 2013

(54) METHOD AND APPARATUS FOR INSTALLING CABLE

(76) Inventor: Ray Charles Pierce, Bolingbrook, IL (US)

( * ) Notice: Subject to any disclaimer, the term of this patent is extended or adjusted under 35 U.S.C. 154(b) by 0 days.

(21) Appl. No.: 13/448,379

(22) Filed: Apr. 16, 2012

(65) Prior Publication Data

US 2012/0256144 A1    Oct. 11, 2012

Related U.S. Application Data

(63) Continuation-in-part of application No. 13/020,977, filed on Feb. 4, 2011, now abandoned.

(51) Int. Cl.
  *B23B 35/00*      (2006.01)
  *B23B 51/00*      (2006.01)
  *H02G 1/06*       (2006.01)

(52) U.S. Cl.
  USPC ...... 408/1 R; 408/226; 408/714; 254/134.3 R

(58) Field of Classification Search
  USPC ...... 408/1 R, 226, 714; 279/99; 254/134.3 R, 254/134.3 FT
  IPC ............................. B23B 35/00; H02G 1/06, 1/08
  See application file for complete search history.

(56) References Cited

U.S. PATENT DOCUMENTS

| | | | | |
|---|---|---|---|---|
| 164,999 | A * | 6/1875 | Holt | 408/223 |
| 1,027,039 | A * | 5/1912 | Down | 279/99 |
| 1,156,336 | A * | 10/1915 | Wegland | 279/99 |
| 1,289,957 | A * | 12/1918 | Tambacopolo | 114/51 |
| 1,712,876 | A * | 5/1929 | Dolezal | 408/208 |
| 3,239,233 | A * | 3/1966 | Stillwagon, Jr. | 279/99 |
| 3,270,362 | A * | 9/1966 | Norton, Jr. | 15/104.33 |
| 3,312,127 | A * | 4/1967 | Stafford | 408/226 |
| 3,611,549 | A * | 10/1971 | Pope | 29/423 |
| 3,697,188 | A * | 10/1972 | Pope | 408/230 |
| 3,984,192 | A * | 10/1976 | Wanner et al. | 408/226 |
| 5,149,231 | A * | 9/1992 | Bowling | 408/82 |
| 5,310,294 | A * | 5/1994 | Perkins | 408/226 |
| 5,529,443 | A * | 6/1996 | Flener | 408/226 |
| 5,888,035 | A * | 3/1999 | Cutler | 408/225 |
| 6,257,808 | B1 * | 7/2001 | Groot | 408/1 R |
| 6,318,704 | B1 * | 11/2001 | Christenson | 254/134.3 R |
| 6,511,266 | B1 * | 1/2003 | Groot | 408/1 R |

(Continued)

FOREIGN PATENT DOCUMENTS

| DE | 4014381 A1 * | 11/1991 |
| GB | 2157991 A * | 11/1985 |

(Continued)

*Primary Examiner* — Eric A Gates
(74) *Attorney, Agent, or Firm* — W. Dennis Drenkoff; Kelly & Krause, L.P.

(57) ABSTRACT

A method of installing cable through material, for example, concrete, wood, masonry, plastic steel, or the like comprising a drill bit with a distal end having a hollow tip with an attachment mechanism for receiving the cable. The drill bit is drilled through the material, and left in place while the cable is attached to the proximal end of the drill bit. There is no need to remove the drill bit from the aperture or material to attach the cable thereto. After attachment to the drill bit, the cable is inserted through the aperture with the drill bit and removed from the drill bit after it passes through the material so it can be attached to a receiver device.

5 Claims, 5 Drawing Sheets

(56) References Cited

U.S. PATENT DOCUMENTS

| | | | |
|---|---|---|---|
| 6,719,274 B2* | 4/2004 | Bowling | 254/134.3 FT |
| 6,739,582 B1* | 5/2004 | Martin | 254/134.3 FT |
| 7,354,228 B2* | 4/2008 | Lambert | 408/226 |
| 8,282,079 B2* | 10/2012 | Petti | 254/134.3 R |
| 2004/0013483 A1* | 1/2004 | Thomsen | 408/226 |
| 2010/0258771 A1* | 10/2010 | White | 254/134.3 R |

FOREIGN PATENT DOCUMENTS

| | | | |
|---|---|---|---|
| GB | 2473068 A | * | 3/2011 |
| GB | 2473473 A | * | 3/2011 |
| JP | 58172909 A | * | 10/1983 |

* cited by examiner

METHOD AND APPARATUS FOR INSTALLING CABLE

This application is a continuation-in-part application of U.S. Ser. No. 13/020,977 filed on Feb. 4, 2011, now abandoned which is incorporated herein by reference.

BACKGROUND OF THE INVENTION

1. Field of the Invention

This invention generally relates to the field of drill bits and hand tools for installing wires and cables through outside walls, inside walls, floors and ceilings of buildings. More specifically, it is directed to a method of installing wires and cables by using an improved drill bit for forming an aperture in and through building materials for insertion of a wire or cable for installation in a building.

2. Description of the Prior Art

Installing cable in new construction encompasses a variety of methods. Cable can be placed in walls, floors, or ceilings as buildings are being constructed. Cable may be placed underground where it is appropriate. However, installing cables in existing buildings presents problems. There may be structures within walls, floors, and ceilings that interfere with the passage of the cable. Installing cable in an existing building is often a three-step procedure. First, an aperture is made in a wall or barrier through which the cable must pass, for example, an outside wall, inside wall, floor or ceiling. Second, the drill bit used to make the aperture is withdrawn from the aperture in the wall or barrier. Third, after the aperture is made, the cable must be inserted into the aperture and pulled or push out of the wall or barrier so it can be attached to the intended device. The cable may be various wires and cables including TV wiring, Ethernet cables, electrical wire, telephone wires, etc. The wall or barrier is typically wood, plasterboard, concrete, metal, plasterboard, plastic, etc. The drill bit for making the aperture is of sufficient length for the dimensions of the wall or barrier. In practice, a drill bit of the appropriate length is used to make an aperture in the wall. After its removal from the wall or barrier, the cable is guided through the aperture by hand or with the assistance of a guide wire, a firm but flexible device upon which the cable is attached. The wire passes the cable through the aperture and out beyond the opposite side of the wall or barrier. There, the cable can be pulled through the aperture for installation to a device. Further, conduits may be inserted in the aperture serving as a guide for the cable to pass therethrough to the opposite side of the wall or barrier. There may be material, for example, insulation, other structures, pipes, wires, etc., that may interfere with the removal of the drill bit and insertion of the conduit or wire into the aperture. Regardless, both of the above methods involve multiple steps for installing cable.

Improvements can be made in methods for installing cable in existing buildings.

SUMMARY OF THE INVENTION

In the preferred embodiment, a facile method of installing cable in an existing building is disclosed comprising forming an aperture in a material, for example, wall board, wood, concrete, plaster, etc. by a drill bit attached to a drilling tool. The drill bit has an improved configuration that allows the attachment of a cable that is to be inserted through the aperture made by the drilling tool and drill bit in a manner so that the drill bit does not have to be removed from the aperture. Preferably, the cable is attached to the drill bit while the drill bit is still within the aperture. Once attached to the drill bit, the cable is carried through the aperture by manual movement of the drill bit through the aperture to the opposite side and out of the material. This method save steps in view of prior art method of installing cable by the attachment of the cable to the drill bit while the drill bit is still in place in the aperture made in the material. The cable is then released from the drill bit and ready to be installed onto a receiver device. Of course, in another embodiment, the drill bit may be removed from the aperture in the wall for attachment of the cable, reinserted into the aperture and pushed through the wall to the opposite side.

In operation, the drill bit is rotated into the material by a drilling tool that may be a power tool or a manual tool. The drill bit is inserted into the material so that the tip of the proximal end of the bit is visible adjacent the material so that the drilling tool or attachment mechanism can be released from the drill bit. The substantial length of the drill bit extends from the proximal end and through the aperture opposite the proximal end of the drill bit. The drill bit may be any desired length but should have sufficient length for passing through the material, whether it is a wall, floor or ceiling of a building structure. The material may be wood, concrete, plaster, plastic, metal, plaster board, brick or any material useful in the construction of buildings. The distal cutting end of the drill bit may be configured to cut easily through the foregoing materials.

In one embodiment, the method comprises installing a cable through materials by attaching a proximal end of a substantially cylindrical drill bit to a drilling tool or connector attached to a drilling tool. The drill bit has a hollow tip at its proximal end near the drilling tool. The hollow tip has an attachment mechanism, preferably threads on the outside circumference of the cylindrically shaped drill bit for securing the proximal end of the drill bit to the end of a cable. The end of a cable has threads for cooperatively attaching to the hollow tip. The drill bit includes a shaft and distal end for cutting through materials. Before the end of the cable is attached to the hollow tip of the distal end of the drill bit, the bit is rotated forming an aperture in the materials. The proximal end of the drill bit is disengaged from the drilling tool or attachment mechanism and the end of the cable is attached to the hollow tip of the proximal end of the drill bit. The drill bit with the cable attached, is then inserted through the aperture to the side opposite the distal end of the drill bit and through the aperture manually. After the distal end of the drill bit passes through the aperture and out of the material, the end of the cable can be removed from the attachment mechanism one the distal end of the cable by unthreading the threads on the mechanism and outside circumference of the hollow tip of the proximal end of the drill bit. The cable can then be pulled through the aperture repeatedly, if necessary, to have a sufficient length of cable for installing it onto a receiver device.

Another embodiment is a drill bit for installing cable having a proximal end for engaging a drilling tool and having a hollow tip with an attachment mechanism for securing an end of the cable to the drill bit. The drill bit has a shaft and distal end for cutting through materials connected to the shaft. The drill bit has a shaft of suitable length for making apertures in materials and passing through the materials to an opposed side of the materials opposite the proximal end of the distal end. The attachment mechanism and circumference of the hollow tip include threads that engagably connect the end of the cable to the hollow tip of the proximal end of the drill bit.

DETAILED DESCRIPTION

Figure 1:
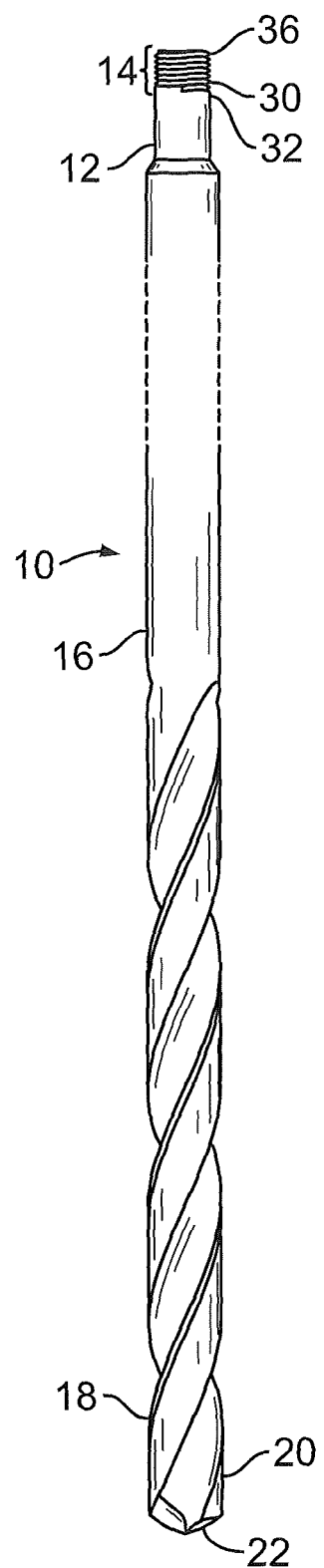
FIG. 1 is a side view of the drill bit of the present invention in a preferred embodiment.
Figure 3:
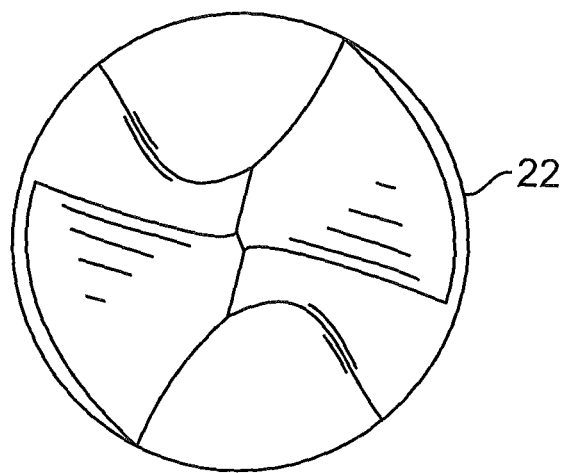
FIG. 3 is an end view of the drill bit of the present invention in a preferred embodiment showing the cutting end of the drill bit.
Figure 2:
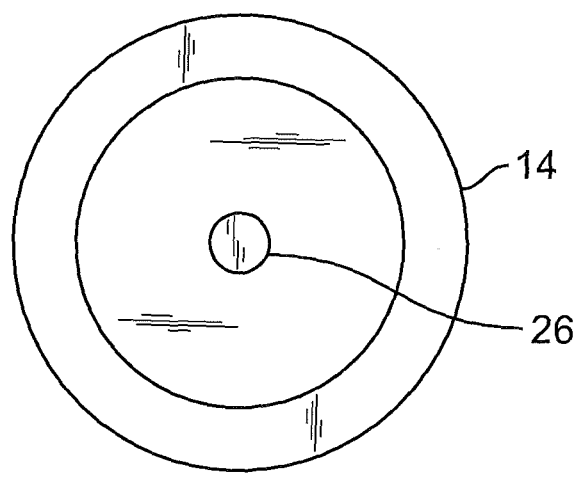
FIG. 2 is a top view of the drill bit of the present invention in a preferred embodiment showing a hollow tip for receiving a coaxial cable.
Figure 4:
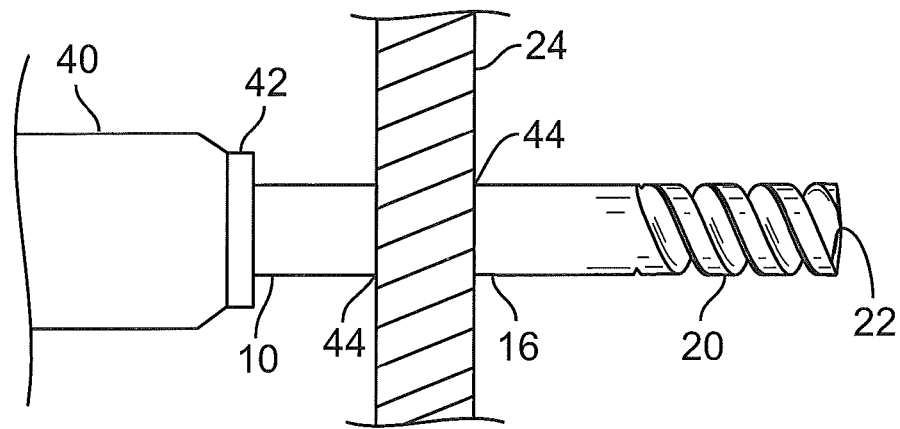
FIG. 4 is a sectional view of a wall with a side view of drill bit of the present invention in a preferred embodiment with the drill bit partially extending through an aperture in the wall.
Figure 5:
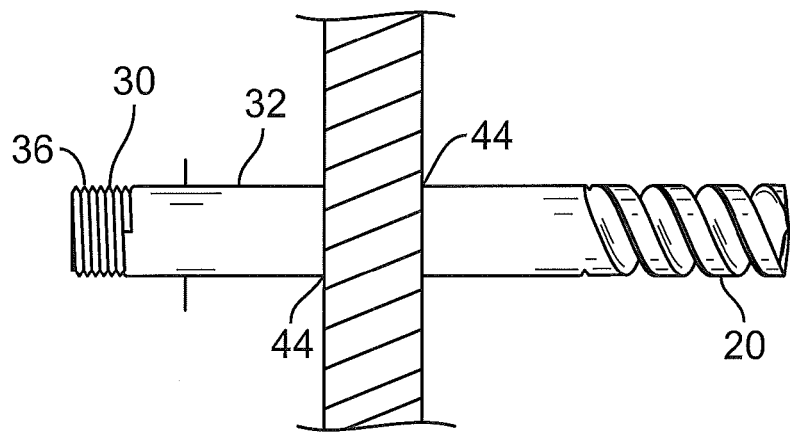
FIG. 5 is the same as FIG. 4 with a drilling tool removed from the drill bit.
Figure 6:
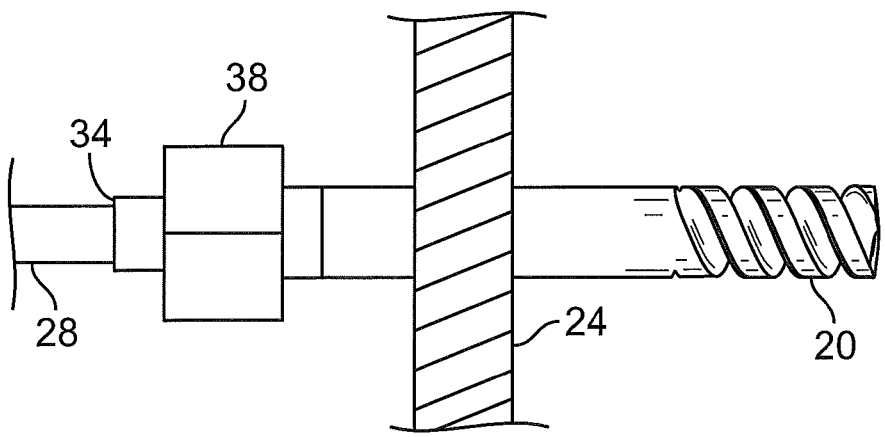
FIG. 6 is a side view of the present invention in a preferred embodiment showing a coaxial cable being attached to the drill bit.
Figure 7:
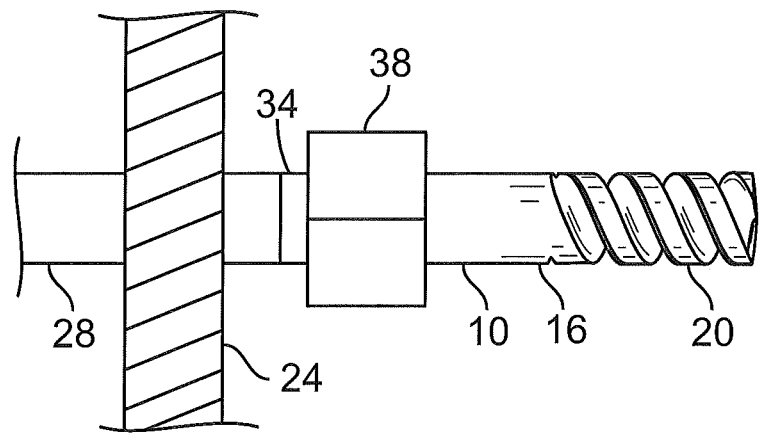
FIG. 7 is a side view of the drill bit of the present invention in a preferred embodiment showing the cable and drill bit inserted through an aperture in the wall.
Figure 8:
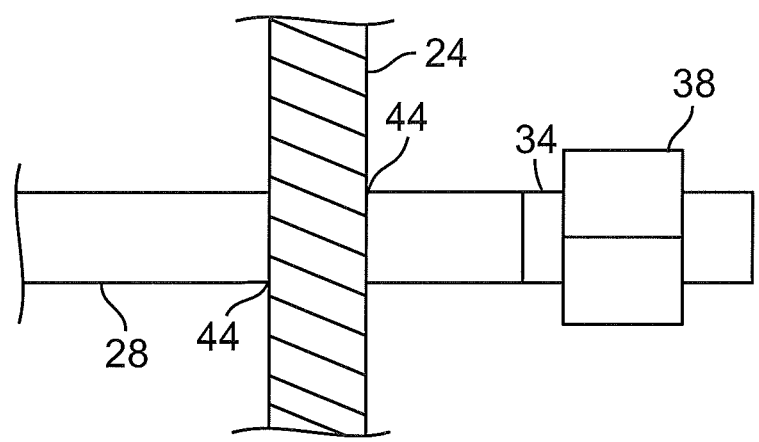
FIG. 8 is a side view of the drill bit of the present invention in a preferred embodiment with the cable being detached from the drill bit.
Figure 9:
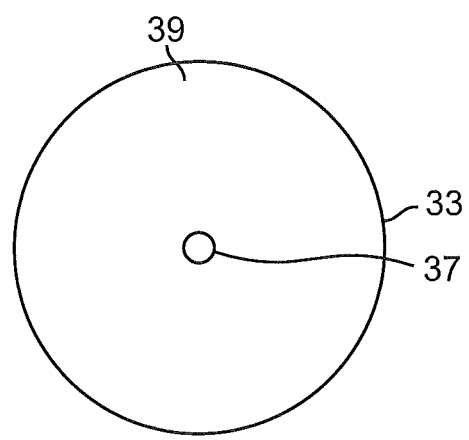
FIG. 9 is a top view of an end of a coaxial cable that is connected to the drill bit of the present invention.

In one embodiment of the invention drill bit 10 comprises a proximal end 12 with a hollow tip 14 on one end of shaft 16 with distal end 18 having a cutting surface with grooves 20 and point 22 on the opposed end of shaft 16. Drill bit 10 may be of any desired length, but it should be sufficiently long enough to pass through material 24 which may be wood, metal, plaster, plastic, masonry, wall board, concrete, etc., in the configuration of a wall on the outside of an existing building, a wall on the inside of a building, floor, ceiling or other configuration. Proximal end 12 is attached to a connector on a drilling tool not shown.

Hollow tip 14 has aperture 26 on distal end 18 of drill bit 10 for receiving cable 28. Cable 28 may be preferably wire TV cable, and coaxial cable. Without being unduly limitative, coaxial cable will be used to describe an embodiment of the invention, while other types of wire and cable may be utilized. Aperture 26 is conveniently positioned for receiving coaxial cable. Attachment mechanism 30 is present on the circumference of outside wall 32 of drill bit 10. Mechanism 30 may be any suitable configuration for connecting end 34 of cable 28 to proximal end 12 of drill bit 10. More specifically, connecting end 34 connects to hollow tip 14 of proximal end 12. Threads 36 on the circumference of outside wall 32 of cylindrically shaped drill bit 10 is one embodiment for connecting end 34 of cable 28. Connecting end 34 has corresponding threads, not shown, inside connector assembly 38 on end 34. Outside wall 33 of the coaxial cable 28 connects into hollow tip 14 of proximal end 12 of drill bit 10. Connector assembly 38 with threads on its inside circumference is rotated to connect to threads 36 on the circumference of outside wall 32 of drill bit 10. Conducting wire 37 inside coaxial cable 28 passes through support 39 and enters aperture 26 in hollow tip 14 of drill bit 10 with attached coaxial cable. Drill bit 10 with the attached coaxial cable is then pushed through an aperture created by rotating the drill bit in the material to be drilled.

In another embodiment, a method of installing cable through material 24 is described utilizing drill bit 10. Proximal end 12 of drill bit 10 is attached to drilling tool 40 or connector 42, if required, which is, attached to drilling tool 40. Drilling tool 40 may be a power driven or manually operated drill. Connector 42 is preferably a chuck for securely attaching distal end 18 to drilling tool 40. Drill bit 10 is then rotated by drilling tool 40 forming aperture 44 in material 24. Aperture 44 is made sufficiently large to allow the passage of cable 28 and connector assembly 34 therethrough. Proximal end 12 is disengaged from connector 42 or drilling tool 40 preferably without taking drill bit 10 out of aperture 40 or material 24. Leaving drill bit 10 in place saves time and provides efficiency to the method. Cable 28 is then attached to hollow tip 14 of the proximal end 12. More specifically, end 34 of cable 28 is attached to attachment mechanism 30 by suitable connectors, preferably threads 36 on the circumference of outside wall 32 of hollow tip 14. End 34 has corresponding threads inside connector assembly 38 that securely connect with threads 36. Drill bit 10 is then inserted or pushed through aperture 44 manually or with a hand tool so that it exits material 24 opposite proximal end 12 by passing through aperture 44. Cable 28 can then be removed from attachment mechanism 30 and connected to a receiver device.

While the invention has been described in preferred embodiments, it will be readily understood to one skilled in the art that many modifications, additions, and deletions may be made to the invention without departing from the spirit and scope of the invention as defined by the following claims. For example, it is possible to use other materials and shapes of the various components, especially, the drill bit, while still falling within the parameters and equivalents of the claims.

What is claimed is:

1. A method of installing coaxial cable through materials comprising the steps of:
    attaching a proximal end of a substantially cylindrical drill bit to a connector on a drilling tool, the drill bit having a hollow tip at the proximal end, the hollow tip having an attachment mechanism for receiving a coaxial cable for securing the proximal end of the drill bit to the end of the coaxial cable, the drill bit having a shaft and a distal end for cutting through materials,
    rotating the drill bit forming an aperture in the materials;
    disengaging the proximal end of the drill bit from the connector on the drilling tool,
    attaching the end of coaxial cable to the attachment mechanism on the hollow tip of the proximal end of the drill bit by inserting supported conducting wire of the coaxial cable in an aperture in the hollow tip of the drill bit and rotating connector assembly with threads on its inside circumference to threads on the outside circumference of the outside wall of the hollow tip of the drill bit,
    inserting the drill bit connected to the coaxial cable through the aperture, and,
    removing the coaxial cable from the attachment mechanism after the proximal end and attached coaxial cable pass through the aperture.

2. The method of claim 1 further comprising pulling the detached end of the coaxial cable after it exits the aperture so that it may be positioned to be installed on a receiver.

3. The method of claim 1 wherein the materials may be wood, concrete, brick, masonry, plaster, plastic, metal and insulation.

4. The method of claim 3 wherein the materials are present in outside walls, inside walls, floors and ceilings of buildings.

5. A drill bit for installing coaxial cable comprising:
    a proximal end of the drill bit for engaging a drilling tool and having a hollow tip with an attachment mechanism for securing an end of a coaxial cable to a drill bit,
    an aperture on the attachment mechanism for receiving the coaxial cable
    a shaft end, and, tip, the attachment mechanism having external threads on the circumference of the hollow tip for connection to the end of the cable which includes corresponding threads on the inside circumference of connector assembly for engaging the external threads on the hollow tip and supported conducting wire of the coaxial cable corresponding to the aperture in the hollow tip of the cable for receiving the supported conducting wire so that the drill bit, after drilling into materials forming an aperture, the end of the attached coaxial cable with the drill bit can be passed through the aperture, and a distal end connected to the shaft.

\* \* \* \* \*